(12) United States Patent
Kurian

(10) Patent No.: US 9,802,384 B2
(45) Date of Patent: Oct. 31, 2017

(54) FIRE RETARDANT LAMINATES

(71) Applicant: W. L. Gore & Associates, Inc., Newark, DE (US)

(72) Inventor: Joseph V. Kurian, Hockessin, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 60 days.

(21) Appl. No.: 14/535,904

(22) Filed: Nov. 7, 2014

(65) Prior Publication Data

US 2016/0129668 A1 May 12, 2016

(51) Int. Cl.
*B32B 5/24* (2006.01)
*D06M 13/292* (2006.01)
(Continued)

(52) U.S. Cl.
CPC ............... *B32B 5/245* (2013.01); *B32B 5/00* (2013.01); *B32B 5/02* (2013.01); *B32B 5/022* (2013.01);
(Continued)

(58) Field of Classification Search
CPC .. B32B 5/00; B32B 5/02; B32B 5/022; B32B 5/024; B32B 5/026; B32B 5/18; B32B 5/22; B32B 5/245; B32B 5/32; B32B 7/00; B32B 7/02; B32B 7/04; B32B 7/10; B32B 7/12; B32B 9/00; B32B 27/00; B32B 2264/00;
(Continued)

(56) References Cited

U.S. PATENT DOCUMENTS 3,953,566 A 4/1976 Gore
4,862,730 A 9/1989 Crosby
(Continued)

OTHER PUBLICATIONS

National Fire Protection Association; NFPA 2112 Standard on Flame-Resistant Garments for Protection of Industrial Personnel Against Flash Fire, 2001.*

*Primary Examiner* — Frank Vineis
(74) *Attorney, Agent, or Firm* — Kilpatrick Townsend & Stockton, LLP

(57) ABSTRACT

Fire retardant laminates including a textile layer, a protective layer, and a fire retardant are provided. The protective layer includes a porous membrane and a coating layer. The porous membrane is positioned between the textile layer and the coating layer. The fire retardant includes one or more phosphonate esters of the general formula:

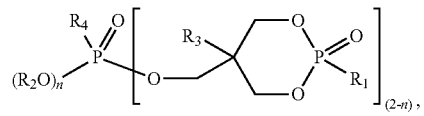

where n=0 or 1, $R_1$ and $R_2$ are $C_1$-$C_4$ alkyl, $R_3$ is H or $C_1$-$C_4$ alkyl, and $R_4$ is a linear or branched alkyl. At least a portion of the phosphonate ester in the fire retardant laminate resides in the coating layer. The fire retardant laminates are suitable for use in protective garments that provide full flammability and burn protection, even after exposure to flammable materials such as petroleum, oils, and lubricants. A method of rendering the fire retardant laminate fire retardant is also provided.

37 Claims, 4 Drawing Sheets

(51) Int. Cl.
| | |
|---|---|
| B32B 5/18 | (2006.01) |
| B32B 27/12 | (2006.01) |
| B32B 27/40 | (2006.01) |
| B32B 5/00 | (2006.01) |
| B32B 5/02 | (2006.01) |
| B32B 5/22 | (2006.01) |
| B32B 5/32 | (2006.01) |
| B32B 7/00 | (2006.01) |
| B32B 7/02 | (2006.01) |
| B32B 7/04 | (2006.01) |
| B32B 7/10 | (2006.01) |
| B32B 7/12 | (2006.01) |
| B32B 9/00 | (2006.01) |
| B32B 27/00 | (2006.01) |
| B32B 27/06 | (2006.01) |
| B32B 27/18 | (2006.01) |
| B32B 27/28 | (2006.01) |
| B32B 27/30 | (2006.01) |
| B32B 27/32 | (2006.01) |

(52) U.S. Cl.
CPC .............. *B32B 5/024* (2013.01); *B32B 5/026* (2013.01); *B32B 5/18* (2013.01); *B32B 5/22* (2013.01); *B32B 5/32* (2013.01); *B32B 7/00* (2013.01); *B32B 7/02* (2013.01); *B32B 7/04* (2013.01); *B32B 7/10* (2013.01); *B32B 7/12* (2013.01); *B32B 9/00* (2013.01); *B32B 27/00* (2013.01); *B32B 27/06* (2013.01); *B32B 27/12* (2013.01); *B32B 27/18* (2013.01); *B32B 27/28* (2013.01); *B32B 27/304* (2013.01); *B32B 27/32* (2013.01); *B32B 27/322* (2013.01); *B32B 27/40* (2013.01); *D06M 13/292* (2013.01); *B32B 2250/00* (2013.01); *B32B 2255/00* (2013.01); *B32B 2255/24* (2013.01); *B32B 2255/28* (2013.01); *B32B 2260/04* (2013.01); *B32B 2262/00* (2013.01); *B32B 2262/02* (2013.01); *B32B 2262/0215* (2013.01); *B32B 2262/0253* (2013.01); *B32B 2262/0261* (2013.01); *B32B 2262/0269* (2013.01); *B32B 2262/0276* (2013.01); *B32B 2262/106* (2013.01); *B32B 2264/00* (2013.01); *B32B 2264/02* (2013.01); *B32B 2264/0278* (2013.01); *B32B 2266/00* (2013.01); *B32B 2266/02* (2013.01); *B32B 2266/025* (2013.01); *B32B 2266/0278* (2013.01); *B32B 2266/104* (2016.11); *B32B 2307/30* (2013.01); *B32B 2307/306* (2013.01); *B32B 2307/3065* (2013.01); *B32B 2307/724* (2013.01); *B32B 2307/7244* (2013.01); *B32B 2307/7246* (2013.01); *B32B 2307/7265* (2013.01); *B32B 2437/00* (2013.01); *D06M 2200/30* (2013.01)

(58) Field of Classification Search
CPC ........ B32B 2264/02; B32B 2264/0278; B32B 2266/00; B32B 2266/02; B32B 2266/025; B32B 2266/0278; B32B 2307/30; B32B 2307/306; B32B 2307/3065; B32B 2307/724; B32B 2307/7244; B32B 2307/7246; B32B 2307/7265; B32B 2437/00; D06M 13/292; D06M 2200/30; D06M 11/68–11/72; Y10T 442/2672–442/2705
USPC .................................. 442/136–147
See application file for complete search history.

(56) References Cited

U.S. PATENT DOCUMENTS

| | | | |
|---|---|---|---|
| 5,183,545 | A | 2/1993 | Branca et al. |
| 5,418,054 | A | 5/1995 | Sun |
| 5,476,589 | A | 12/1995 | Bacino |
| 5,708,044 | A | 1/1998 | Branca |
| 6,541,589 | B1 | 4/2003 | Baillie |
| 7,306,729 | B2 | 12/2007 | Bacino et al. |
| 7,531,611 | B2 | 5/2009 | Sabol et al. |
| 8,637,144 | B2 | 1/2014 | Ford |
| 2005/0067584 | A1 | 3/2005 | Bergh et al. |
| 2009/0110919 | A1 | 4/2009 | Panse |
| 2009/0155662 | A1 | 6/2009 | Durante et al. |
| 2009/0246485 | A1* | 10/2009 | Panse ................. A41D 31/0027 428/201 |
| 2010/0151184 | A1* | 6/2010 | Grigat ................. D06M 13/292 428/96 |
| 2010/0248324 | A1 | 9/2010 | Xu et al. |
| 2011/0076494 | A1 | 3/2011 | Gunzel et al. |
| 2011/0237144 | A1* | 9/2011 | Chew ................. C08G 18/4829 442/136 |

\* cited by examiner

FIRE RETARDANT LAMINATES

TECHNICAL FIELD

The present disclosure relates generally to fire retardant laminates, and more particularly, to laminates treated with one or more phosphonate esters which render the laminates fire retardant.

BACKGROUND

Traditional fire retardant materials used in garments have several limitations. They are expensive, stiff, difficult to dye and print, and uncomfortable for the wearer, thus limiting the widespread use of such garments. Moreover, traditional topical fire retardant treatments typically reduce moisture vapor transmission rates and show loss of fire retardant activity upon washing.

SUMMARY

One embodiment of the invention relates to a fire retardant laminate that includes (1) a textile layer, (2) a protective layer that includes a porous membrane and a coating layer, and (3) a fire retardant that includes one or more phosphonate esters having the general formula:

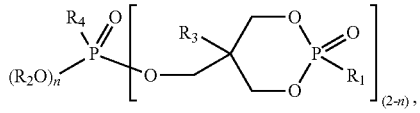

where n=0 or 1, $R_1$ and $R_2$ are $C_1$-$C_4$ alkyl, $R_3$ is H or $C_1$-$C_4$ alkyl, and $R_4$ is a linear or branched alkyl. In at least one embodiment, the fire retardant includes an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl) methyl methylphosphonate. The porous membrane is positioned between the textile layer and the coating layer. In at least one embodiment, the fire retardant penetrates the textile layer, the porous membrane layer, and at least partially penetrates the coating layer. The coating layer includes a polyurethane, and may be a monolithic coating of polyurethane (e.g., continuous coating), a polyurethane membrane, or a layer of polyurethane applied in a discontinuous manner (e.g., a discontinuous polyurethane layer). The porous membrane may include a porous fluoropolymer membrane or a polyurethane membrane. The fire retardant laminate may also include at least one additional porous membrane layer and/or additional textile layer(s). The textile layer(s) may be formed of a nonwoven textile, a woven textile, or a knit. Additionally, the textile layer(s) may have thereon a water-repellant substance. When tested in vertical flame tests according ASTM D6413, the fire retardant laminates had an afterflame of less than about 2 seconds and a char length of less than about 10 centimeters. Further, the fire retardant laminate maintains fire retardance even after the laminate has been subjected to petroleum, oil, lubricant(s), or combinations thereof prior to being subjected to vertical flame tests.

A second embodiment of the invention relates to a fire retardant filter media that includes (1) a nonwoven textile layer, (2) a spun bonded layer, (3) a porous membrane layer positioned between the nonwoven textile layer and the spun bonded layer, and (4) a fire retardant that includes one or more phosphonate esters having the general formula:

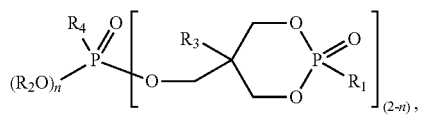

where n=0 or 1, $R_1$ and $R_2$ are $C_1$-$C_4$ alkyl, $R_3$ is H or $C_1$-$C_4$ alkyl, and $R_4$ is a linear or branched alkyl. In one embodiment, the fire retardant includes an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl) methyl methylphosphonate. The fire retardant at least partially penetrates one or both of the nonwoven textile layer and the spun bonded layer. In at least one embodiment, the nonwoven textile layer is a polyester nonwoven textile, the porous membrane layer is an expanded polytetrafluoroethylene (ePTFE) membrane, and the spun bonded layer is a spun bonded polypropylene textile.

A third embodiment of the invention relates to a fire retardant textile composite that includes (1) a first textile layer, (2) a second textile layer, (3) an adhesive bonding said first textile and said second textile, and (4) a fire retardant that includes one or more phosphonate esters having the general formula:

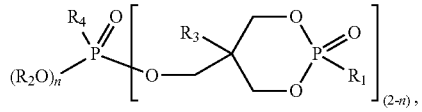

where n=0 or 1, $R_1$ and $R_2$ are $C_1$-$C_4$ alkyl, $R_3$ is H or $C_1$-$C_4$ alkyl, and $R_4$ is a linear or branched alkyl. In one embodiment the fire retardant includes an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl) methyl methylphosphonate. The fire retardant at least partially penetrates one or both of the first textile layer and the second textile layer and is located in the interstices formed between the fibers forming the textile(s). In one embodiment, the first textile layer and the second textile layer include polyester fibers, poly(trimethylene terephthalate) fibers, polybenzimidazole fibers, para-aramid fibers, nylon fibers, meta-aramid fibers or combinations thereof. In another embodiment, the first textile is a nylon textile and the second textile is a polyester or polyester blends with cotton.

A fourth embodiment of the invention relates to a method for rendering a laminate fire retardant that includes (1) applying a fire retardant that includes one or more phosphonate esters having a general formula:

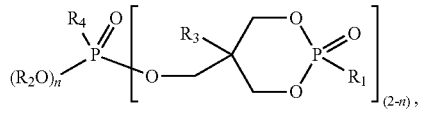

where n=0 or 1, $R_1$ and $R_2$ are $C_1$-$C_4$ alkyl, $R_3$ is H or $C_1$-$C_4$ alkyl, and $R_4$ is a linear or branched alkyl to a top surface of a laminate to form a treated laminate and (2) drying the treated laminate. The laminate includes (1) a textile layer and (2) a protective layer that includes a porous membrane and a coating layer. The coating layer includes a polyurethane. The porous membrane is positioned between the textile layer and the coating layer. The porous membrane may include a polytetrafluoroethylene membrane, an expanded polytetrafluoroethylene membrane, or a polyurethane membrane. The method may also include permitting the fire retardant to penetrate the textile layer, the porous membrane, and at least partially penetrate the coating layer. In one embodiment, the method includes permitting the fire retardant to penetrate the textile layer and at least partially into the protective layer. The method may further include applying a water repellant to a surface of the textile layer. In one embodiment, the fire retardant includes an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl)methyl methylphosphonate.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Figure 1A:
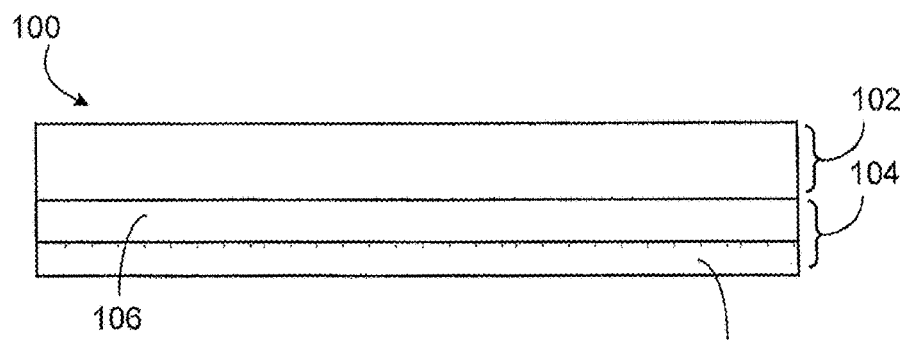
FIG. 1A is a schematic illustration depicting a laminate having a textile layer and a protective layer including a porous membrane and a coating layer in accordance with at least one embodiment of the invention.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting. It is to be noted that the terms "flame retardant" and "fire retardant" may be used interchangeably herein. In addition, the terms "fabric" and "textile" may be interchangeably used within this application.

The present invention is directed to flame retardant laminates that include at least one textile layer, a protective layer, and a flame retardant. The protective layer includes at least one porous membrane and a coating layer. The flame retardant is applied such that the fire retardant penetrates the textile layer, the porous membrane, and at least part of the coating layer. When tested in vertical flame tests according ASTM D6413, the fire retardant laminates had an afterflame of less than about 2 seconds and a char length of less than about 10 centimeters. The fire retardant laminates are suitable for use in protective garments that provide full flammability and burn protection, even after exposure to flammable materials such as petroleum, oils, and lubricants.

Figure 1B:
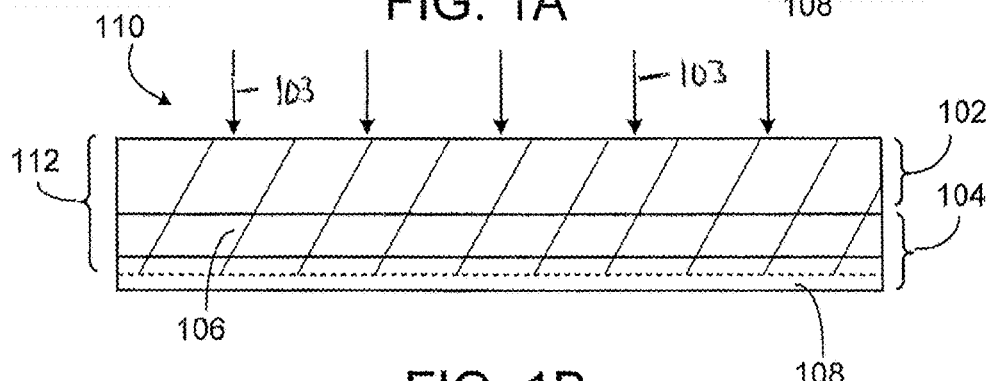
FIG. 1B is a schematic illustration depicting a fire retardant laminate having a textile layer and a protective layer including a porous membrane and a coating layer where the fire retardant at least partially penetrates the coating layer according to at least one embodiment of the invention.

Turning to FIG. 1A, depicts a laminate 100 that includes a textile layer 102 and a protective layer 104. As depicted in FIG. 1A, the protective layer 104 includes a porous membrane 106 and a coating layer 108, such that the porous membrane 106 is positioned between the textile layer 102 and the coating layer 108. Textile layer 102 and protective layer 104 may be held together either directly (e.g., adhered or bonded together) or indirectly (e.g., each layer adhered or bonded to a single intervening layer or each layer adhered or bonded to different intervening layers). FIG. 1B depicts a fire retardant laminate 110 that is prepared by treating laminate 100 with a fire retardant 112. The term "fire retardant" as used in this application is meant to describe at least one, or the combination of at least two, of the phosphonate esters described herein and represented by Formula I. As indicated by the arrows 103, fire retardant 112 may be applied to the textile layer 102 such that the fire retardant penetrates the textile layer 102, the porous membrane 106, and at least partially penetrates into the coating layer 108, such that the fire retardant 112 is present in the textile layer 102, the porous membrane 106, and the coating layer 108.

The textile layer 102 may be a woven fabric, a nonwoven fabric, or a knit fabric. Woven fabrics for use in the fire retardant laminates include natural fibers and/or synthetic fibers. Suitable natural fibers for the fire retardant laminates include, for example, cotton, ramie, bamboo, wool, silk, linen, and jute. Fibers suitable for use in the fire retardant laminates include, but are not limited to, nylon, polyester, rayon, aramid, acrylic, modacrylic, olefin, spandex, triexta, and the like. Non-limiting examples of suitable nonwoven fabrics include thermoplastic fibers, carbon fibers, and aramid fibers. In some embodiments, the thickness of the textile layer 102 is in a range from 0.01 mm to 2 mm. In certain embodiments, the textile layer 102 includes one or more textile layers bonded, adhered, or otherwise held together.

In one embodiment, the textile layer 102 may be modified prior to the addition of the fire retardant 112. In one example, and as described in U.S. Patent Publication No. 2009/0110919 to Panse, a polymer resin-expandable graphite mixture may be applied to a surface of the textile layer 102 in either a continuous or a discontinuous pattern. A suitable expandable graphite has an average expansion rate of at least 9 µm/° C. between about 180° C. and about 280° C. Depending on the desired properties of the laminate, it may be desirable to use an expandable graphite having an expansion rate greater than about 12 µm/° C. between about 180° C. and about 280° C. or an expansion rate greater than about 15 µm/° C. between about 180° C. and about 280° C. The particle size of the expandable graphite should be chosen so that the polymer resin-expandable graphite mixture may be applied with the selected application method. For example, where the polymer resin-expandable graphite mixture is applied by a gravure printing technique, the expandable graphite particle size should be small enough to fit in the gravure cells.

The polymer in the polymer resin-expandable graphite mixture has a melt temperature less than about 280° C. In one embodiment, the polymer is sufficiently flowable or deformable to allow the expandable graphite to expand substantially upon exposure to heat at or below about 300° C., or below about 280° C. As used herein, the term "expand substantially" is meant to define expandable graphite that has been expanded to its complete expansion capacity or to nearly its complete expansion capacity. Polymers suitable for use in the polymer resin-expandable graphite mixture have a modulus and elongation at about 300° C. or less, which allows the graphite to expand. In addition, the polymers may be elastomeric, cross-linkable, or thermoplastic (e.g., having a melt temperature between about 50° C. and about 250° C.). Polymers suitable for use in the polymer resin-expandable graphite mixture include, but not limited to, polyesters, thermoplastic polyurethanes, and cross-linkable polyurethanes, polyester, polyamide, acrylic, vinyl polymer, and polyolefin, silicones, epoxies, and combinations thereof. Fire retardant materials such as organophosphates (e.g., triphenyl phosphate (TPP), resorcinol bis-(diphenylphosphate) (RDP), bisphenol-A (diphenylphosphate) (BADP), tricresyl phosphate (TCP), organophosphonates, or organophosphinates) optionally may be incorporated in the polymer resin.

The polymer resin-expandable graphite mixture includes less than or equal to about 50 wt %, less than or equal to about 40 wt %, or less than or equal to about 30 wt % expandable graphite based on the total weight of the polymer resin-expandable graphite mixture. The balance substantially includes the polymer. As used herein, the phrase "substantially includes the polymer" is meant to denote that all or nearly all of the balance of the polymer resin-expandable graphite mixture is formed of the polymer. In other embodiments, the expandable graphite includes less than or equal to about 20 wt %, less than or equal to about 10 wt %, or less than or equal to about 5 wt % of the mixture, and the balance substantially includes the polymer resin. Loadings of expandable graphite as low as about 1% may be used. In at least one embodiment, the expandable graphite may be present in an amount from about 5 wt % to about 50 wt % based on the total weight of the polymer resin-expandable graphite mixture. Additives such as pigments, fillers, antimicrobials, processing aids, and stabilizers may also be added to the polymer resin-expandable graphite mixture.

The polymer resin-expandable graphite mixture may be applied to an inner surface of the textile layer 102 as a continuous or discontinuous layer. When enhanced breathability and/or hand is desired, the polymer resin-expandable graphite mixture may be applied discontinuously to form a layer of heat reactive material having less than 100% surface coverage. A discontinuous application may provide less than 100% surface coverage by forms including but not limited to dots, grids, lines, and combinations thereof. A surface coverage of less than about 90%, less than about 80%, less than about 70%, less than about 60%, less than about 50%, less than about 40%, or less than about 30% may be used.

The average distance between adjacent areas of the discontinuous pattern (e.g., between dots) is less than about 5 mm, less than about 3.5 mm, less than about 2.5 mm, less than about 1.5 mm, or less than about 0.5 mm. For example, in a dot pattern printed onto a substrate, the spacing between the dots may be measured. One method for achieving a coverage of less than 100% includes applying the polymer resin-expandable graphite mixture by printing the mixture onto a surface of textile layer 102 by, for example, gravure printing. The polymer resin-expandable graphite mixture may be applied to textile layer 102 to achieve an add-on weight of between about 10 gsm to about 100 gsm of the mixture. In some embodiments, the mixture is applied to the textile layer 102 to achieve an add-on weight of less than about 100 gsm, less than about 75 gsm, less than about 50 gsm, or less than about 25 gsm.

In one or more embodiment, the porous membrane 106 is a fluoropolymer membrane such as, for example, a polytetrafluoroethylene (PTFE) membrane or an expanded polytetrafluoroethylene (ePTFE) membrane. Expanded polytetrafluoroethylene (ePTFE) membranes prepared in accordance with the methods described in U.S. Pat. No. 7,306,729 to Bacino et al., U.S. Pat. No. 3,953,566 to Gore, U.S. Pat. No. 5,476,589 to Bacino, or U.S. Pat. No. 5,183,545 to Branca et al. may be used herein. It is to be understood that throughout the application, the term PTFE may also include expanded PTFE, expanded modified PTFE, and expanded copolymers of PTFE, as described in U.S. Pat. No. 5,708,044 to Branca, U.S. Pat. No. 6,541,589 to Baillie, U.S. Pat. No. 7,531,611 to Sabol et al., U.S. Pat. No. 8,637,144 to Ford, and U.S. Patent Publication No. 2010/0248324 to Xu et al. The thickness of the fluoropolymer membranes may be between about 10 µm and about 100 µm.

In an alternate embodiment, porous membrane 106 is a polyurethane membrane, which may also, or alternatively, serve as an intermediate layer 122. It is to be appreciated that both a continuous polyurethane layer (e.g., a polyurethane membrane or a continuous coating of polyurethane) and a discontinuous polyurethane layer (e.g., a polyurethane applied in a discontinuous manner) are within the purview of the invention.

The coating layer includes a polyurethane, and may be a monolithic coating of polyurethane (e.g., continuous coating), a polyurethane membrane, or a layer of polyurethane applied in a discontinuous manner (e.g., a discontinuous polyurethane layer). In some embodiments, the coating layer 108 is a monolithic, continuous coating of polyurethane on the porous membrane 106. The coating layer 108 is positioned on a surface of the porous membrane 106 such that the porous membrane 106 is positioned between the coating layer 108 and the textile layer 102. The coating layer 108 may be bonded, adhered, or otherwise held to the porous membrane 106.

Figure 1C:
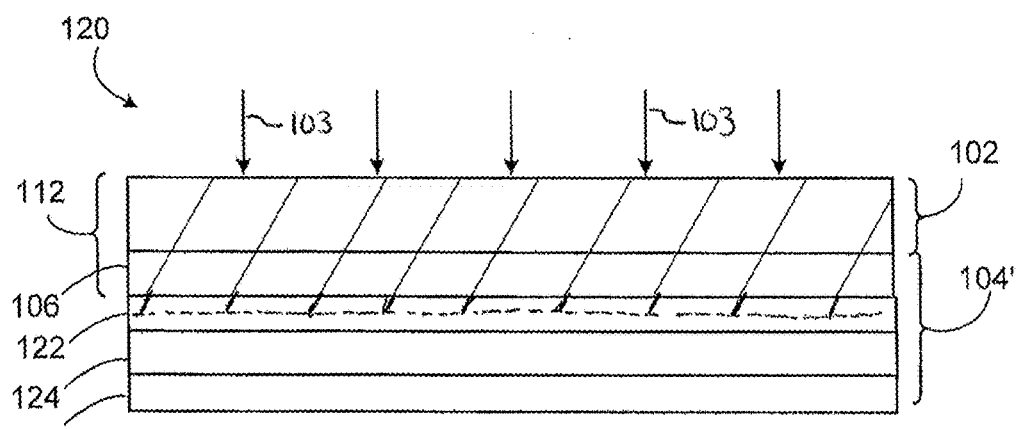
FIG. 1C is a schematic illustration depicting a fire retardant laminate having a protective layer including two porous membranes, an intermediate layer, and a coating layer where the fire retardant at least partially penetrates the intermediate layer according to at least one embodiment of the invention.

The protective layer 104 may include one or more additional layers, such as, for example, one or more of the porous membranes as described herein. In one non-limiting example depicted in FIG. 1C, the laminate 120 includes a protective layer 104' that includes an intermediate layer 122 positioned between porous membranes 106 and 124. In one embodiment, the intermediate layer 122 may be a polyurethane layer, or a layer that includes polyurethane, such as, but not limited to, a polyurethane membrane, a continuous coating of polyurethane, or a discontinuous layer of polyurethane. The intermediate layer 122 may also, or alternatively, include an elastomer, a polymer resin, an expandable graphite, an adhesive, an antistatic material, or combinations thereof. In some embodiments, the intermediate layer 122 is an elastomer that includes silicone.

The fire retardant 112 is an aqueous solution that includes a phosphonate ester having the following general formula:

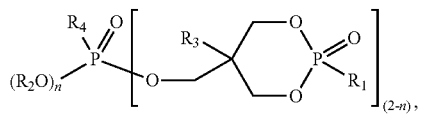

Formula I in which n=0 or 1, $R_1$ and $R_2$ are $C_1$-$C_4$ alkyl, $R_3$ is H or $C_1$-$C_4$ alkyl, and $R_4$ is a linear or branched alkyl. In some embodiments, the fire retardant 112 includes a mixture of two or more phosphonate esters of the general formula shown above as Formula I (e.g., a first phosphonate ester in which n=0, and a second phosphonate ester in which n=1). In at least one embodiment, the fire retardant 112 includes a mixture of one or more phosphonate esters of Formula I and one or more other phosphorous containing compounds such as phosphate esters.

When fire retardant 112 includes two different phosphonate esters of Formula I (e.g., phosphonate ester A and phosphonate ester B, in which, for example, n=0 and n=1, respectively). The phosphonate esters may be present in a range of weight ratios (e.g., A:B is about 0.3 to about 2, or A:B is about 1). In one embodiment, the fire retardant 112 includes an aqueous mixture of phosphonic acid, methyl-, bis((5-ethyl-2-methyl-2-oxido-1,3,2-dioxaphosphorinan-5-yl)methyl)ester (phosphonate ester A, molecular weight (MW)=448.32, with n=0), shown below (CAS No. 42595-45-9),

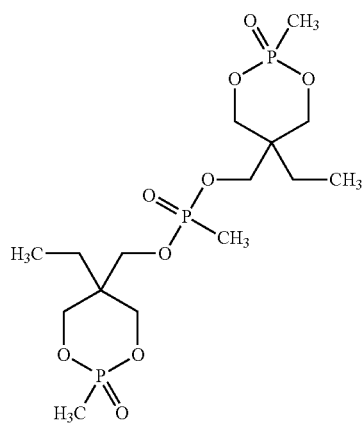 [SMILES: CCC1(COP(C)(=O)OCC2(CC)COP(C)(=O)OC2)COP(C)(=O)OC1]

and methyl(5-ethyl-2-methyl-2-oxido-1,3,2-dioxaphosphorinan-5-yl)methyl methylphosphonate (phosphonate ester B, molecular weight (MW)=286.20, with n=1), shown below (CAS No. 41203-81-0):

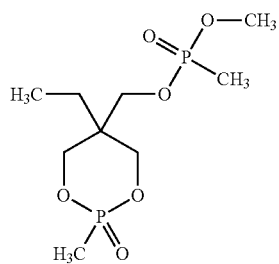 [SMILES: CCC1(COP(C)(=O)OC)COP(C)(=O)OC1]

in a weight ratio of A:B of about 0.3 to about 2. In one example, the weight ratio of A:B is about 1.

To prepare the fire retardant 112, one or more phosphonate esters of Formula I depicted above are dissolved in water and prepared as an aqueous solution having a desired concentration (e.g., about 10 wt % to about 30 wt %, about 15 wt % to about 25 wt %, or about 20 wt %, with wt % referring to the total weight of phosphonate esters present). The pH of the aqueous solution is adjusted so as to fall in a range from about 5 to about 7 (e.g., about 5.5 to about 6.5, or about 5.5 to about 6). The fire retardant 112 may be applied to the fire retardant laminate 110 in a variety of methods, including kiss coating or spray coating, so long as some of the phosphonate ester fire retardant 112 penetrates through textile layer 102, the porous membrane 106, and at least partially resides in the coating layer 108 of the protective layer 104. After the application of the fire retardant 112, the laminate is dried. Drying may include, for example, heating the laminate in a convection oven to a temperature of up to about 200° C. (e.g., from about 180° C. to about 190° C., or from about 180° C. to about 185° C.).

After drying, the amount of phosphonate ester present in the fire retardant laminate that resides in the protective layer can be quantified by assessing the weight percentage of phosphorus that resides in the protective layer. As described herein, at least about 1 wt % of the phosphorus in the fire retardant laminate present as phosphonate ester resides in the protective layer. In some embodiments, up to about 5 wt % or more of the phosphorus present as phosphonate ester in the fire retardant laminate resides in the protective layer. In other embodiments, about 1 wt % to about 5 wt %, about 2 wt % to about 3.5 wt %, or about 2.5 wt % to about 3 wt % of the phosphorus present as phosphonate ester in the fire retardant laminate resides in the protective layer (i.e. the porous membrane and the coating layer). In some embodiments, the majority of the phosphorus present as phosphonate ester in the protective layer resides in the coating layer.

Figure 2:
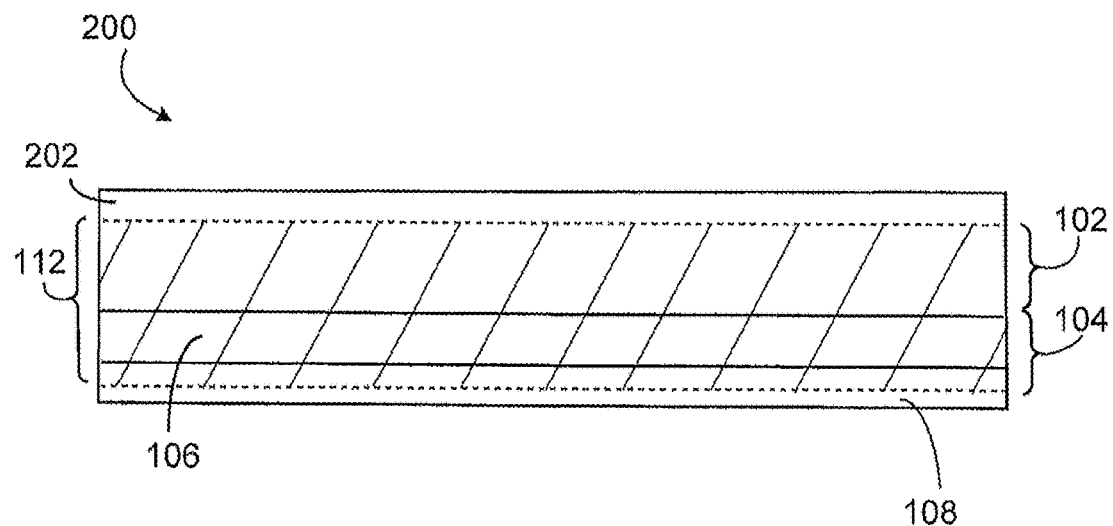
FIG. 2 is a schematic illustration depicting a fire retardant laminate having a water-repellant coating, a textile layer, and a protective layer including a porous membrane and a coating layer where the fire retardant at least partially penetrates the coating layer in accordance with an embodiment of the invention.

FIG. 2 depicts the fire retardant laminate 200 with a water-repellant coating 202 on a surface of the textile layer 102. The water-repellant coating 202 may be formed by coating the textile layer 102 with a water-repellant substance such as, for example, a fluoroacrylate, after the fire retardant 112 has been applied to the laminate. The protective layer 104 is depicted in FIG. 2 as including a porous membrane 106 and a coating layer 108. As shown in FIG. 2, the fire retardant 112 penetrates the textile layer 102 and the porous membrane 106 such that at least a portion of the fire retardant 112 resides in the coating layer 108.

Figure 3:
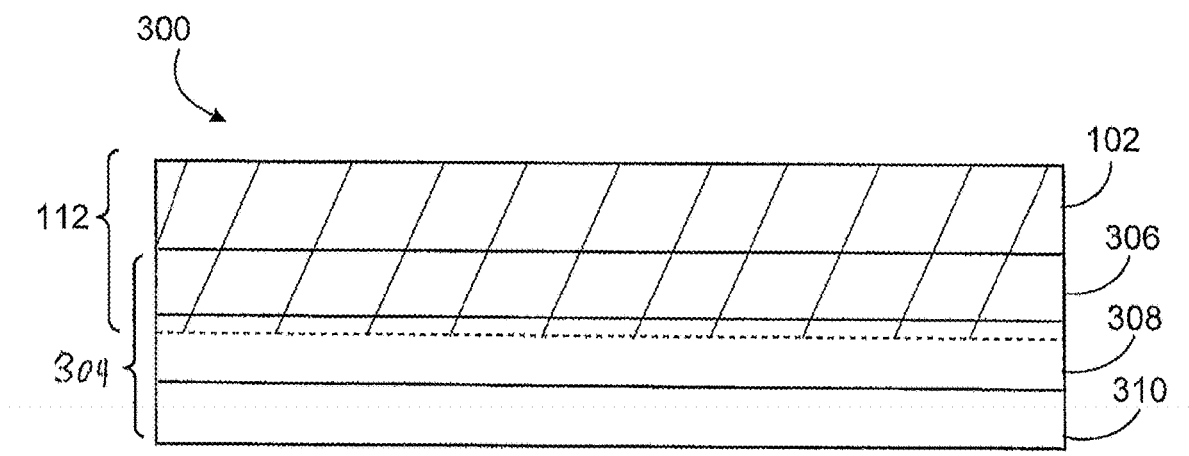
FIG. 3 is a schematic illustration depicting a fire retardant laminate having a textile layer and a protective layer including a polyurethane layer sandwiched between two porous membranes where the fire retardant at least partially penetrates the polyurethane layer in accordance with at least one embodiment of the invention.

FIG. 3 depicts a fire retardant laminate 300 with a textile layer 102 and a protective layer 304. As depicted in FIG. 3, protective layer 304 includes three layers 306, 308, and 310. The layers 306, 308, and 310 may be the same or different. In some embodiments, layers 306 and 310 are the same, and layer 308 is different. In at least one embodiment, layers 306 and 310 are porous membranes as described herein and layer 308 is a polyurethane layer (e.g., a polyurethane membrane, a monolithic coating of polyurethane (e.g., a continuous coating of polyurethane), or discontinuous polyurethane layer (e.g., a discontinuous coating of polyurethane)) positioned between the porous membranes. The fire retardant 112 is depicted as penetrating the penetrating layer 306 (e.g., first porous membrane) and is partially present in layer 308 (e.g., coating layer). In some embodiments, the fire retardant 112 is present throughout the layer 308, and may at least partially penetrate layer 310 (e.g., second porous membrane). At least about 1 wt % (e.g., about 1 wt % to about 5 wt %, about 2 wt % to about 3.5 wt %, or about 2.5 wt % to about 3 wt %) of the phosphorus present as phosphonate ester in the fire retardant laminate resides in the protective layer 304, thus imparting fire retardant properties to the protective layer 304. In some embodiments, the majority of the phosphorus present as a phosphonate ester in the protective layer 304 at least partially penetrates layer 308 (e.g., a layer such as a polyurethane layer positioned between porous membranes).

Figure 4:
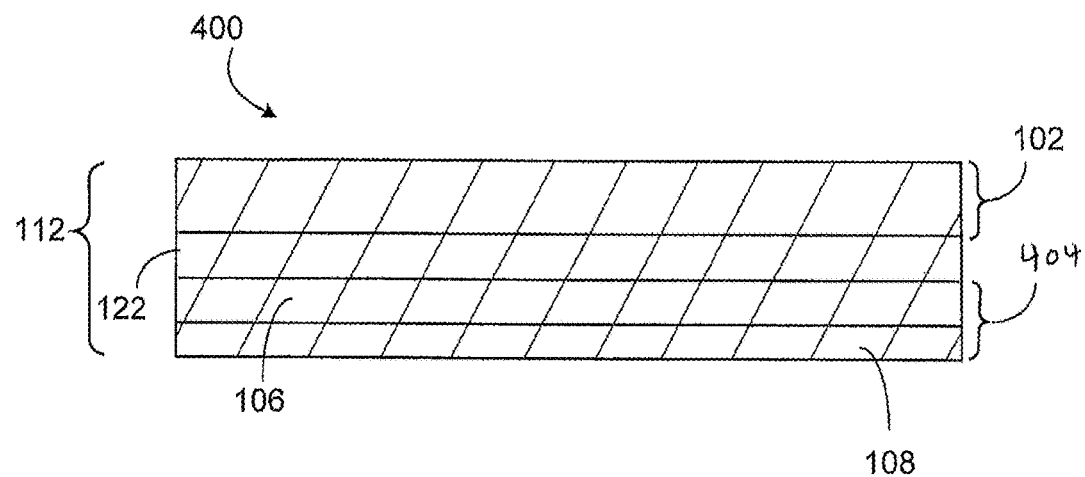
FIG. 4 is a schematic illustration depicting a fire retardant laminate having a textile layer, a protective layer including a porous membrane and a coating layer, and an intermediate layer positioned between the textile layer and the protective layer where the fire retardant fully penetrates the coating layer according to at least one embodiment of the invention.

FIG. 4 depicts a fire retardant laminate 400 having a textile layer 102, a protective layer 404, and an intermediate layer 122 positioned between the textile layer 102 and the protective layer 404. The protective layer 404 is depicted as including a porous membrane 106 and a coating layer 108. The intermediate layer 122 may be adhered, bonded, or otherwise held to the textile layer 102, the protective layer 104, or both. As depicted, the fire retardant 112 penetrates the textile layer 102, the intermediate layer 122, the porous membrane 106, and the coating layer 108, such that at least a portion of the fire retardant 112 resides in the coating layer 108 of the protective layer 404. In the embodiment depicted in FIG. 4, the fire retardant 112 completely penetrates the coating layer 108.

Figure 5:
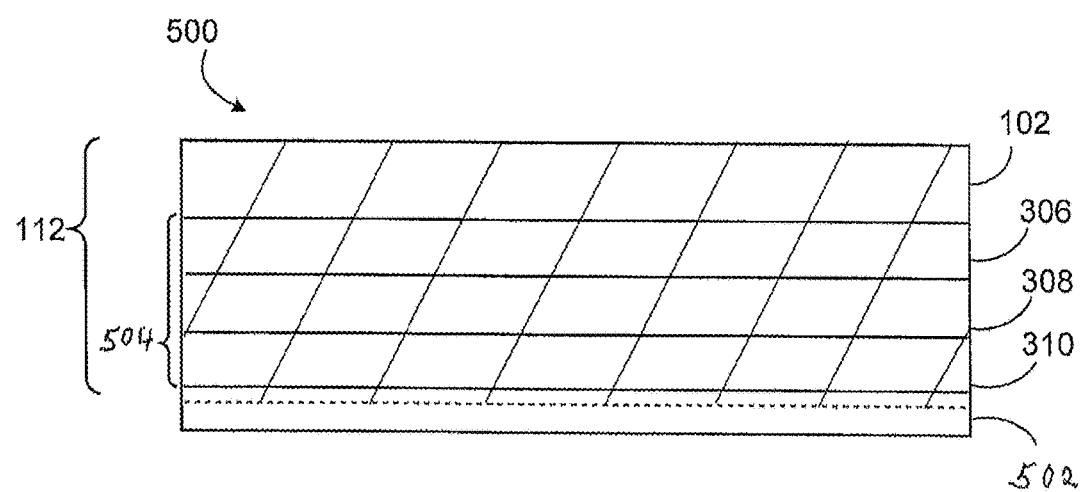
FIG. 5 is a schematic illustration depicting a fire retardant laminate having a first textile layer, a second textile layer, and a protective layer including a polyurethane layer sandwiched between two porous layers where the fire retardant at least partially penetrates the second textile layer in accordance with one or more embodiments of the invention.

FIG. 5 depicts a fire retardant laminate 500 having a textile layer 102, a second textile layer 502, and a protective layer 504 positioned between the textile layer 102 and the second textile layer 502. The protective layer 504 is depicted as including layers 306, 308, and 310, as described above with respect to FIG. 3. Layers 306 and 310 may be porous membranes. Textile layer 502 may be, for example a woven fabric, a nonwoven fabric, or knit fabric (e.g., a nonwoven layer of aramids and/or other synthetic or natural fibers or blends thereof), and may be adhered, bonded, or otherwise held to a surface of the protective layer 504 opposing the second textile layer 502. As depicted in FIG. 5, the fire retardant 112 penetrates layers 306, 308, and 310 in the protective layer 504, as well as the second textile layer 502, such that at least a portion of the fire retardant resides in the protective layer 504, and at least partially penetrates the second textile layer 502. In some embodiments, the fire retardant 112 penetrates only a portion of protective layer 504 (e.g., layers 306 and 308).

In another embodiment, the fire retardant may be used to render filter media fire retardant. Filter media may be constructed from felts and/or fabrics made from a variety of materials, including polyesters, polypropylenes, aramids, and fluoropolymers, among others. The particular materials used are dependent upon what is being filtered, the operating conditions of the system, and the cost. In one non-limiting example, a filter media including a polyester nonwoven textile, an expanded polytetrafluoroethylene (ePTFE) membrane, and a spun bonded polypropylene may be rendered fire retardant by the application of one or more of the phosphonate esters described herein. The ePTFE membrane is positioned between the polyester nonwoven and the spun bonded polypropylene. In at least one embodiment, the fire retardant is applied to the surface of the nonwoven polyester textile. The phosphonate esters penetrate the outer textile and remains in the interstices between the fibers forming the textile. As demonstrated in Example 15 below, the addition of the fire retardant significantly reduces the afterflame and char length for the phosphonate ester treated filter media compared to the control (no addition of the fire retardant).

In a further embodiment, a laminate including at least two textile layers may also be rendered fire retardant with the application of one or more of the phosphonate esters described herein. The textile layers are not particularly limited, and may include woven textiles, nonwoven textiles, felts, and/or knits. In addition, the textile layers form the outer surfaces of the laminate. One non-limiting example is a laminate formed of a nylon textile bonded to a polyester laminate. In such a laminate, the fire retardant may be applied to one or both of the textile layers. As described above, the fire retardant penetrates the textile(s) and is located within the interstices formed between the fibers of the textile, thereby rendering the laminate fire retardant.

Similarly, textile composites that include one or more textiles formed from polyester fibers, poly(trimethylene terephthalate) (PTT) fibers, polybenzimidazole (PBI) fibers, para-aramid fibers, heavy-denier nylon fibers, and/or meta-aramid fibers may be rendered fire retardant with the application of one or more of the phosphonate esters forming the fire retardant to the textile. In one embodiment, the textile composite is formed of a first textile that is a nylon textile and a second textile that is a polyester or polyester blends with cotton. Upon application of the fire retardant, the phosphonate esters penetrate the textile and remain in the interstices formed between the fibers forming the textile.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Test Methods

It should be understood that although certain methods and equipment are described below, other methods or equipment determined suitable by one of ordinary skill in the art may be alternatively utilized.

Vertical Flame Test (VFT)

All samples were tested according to ASTM D6413. Samples (3"×12" and 3"×8") were exposed to flame for 12 seconds. One or more of afterflame (AF) in seconds, afterglow (AG) in seconds, char length (CL) in centimeters, and the presence of melting/dripping were recorded. Samples with afterflame less than 2 seconds and char length less than 10 cm are considered to pass the vertical flame test. An average of three measurements was used.

Moisture Vapor Transmission Rate (MVTR)

A description of the test employed to measure moisture vapor transmission rate (MVTR) is given below. The procedure has been found to be suitable for testing films, coatings, and coated products.

In the procedure, approximately 70 ml of a solution consisting of 35 parts by weight of potassium acetate and 15 parts by weight of distilled water was placed into a 133 ml polypropylene cup, having an inside diameter of 6.5 cm at its mouth. An expanded polytetrafluoroethylene (PTFE) membrane having a minimum MVTR of approximately 85,000 g/m²/24 hrs as tested by the method described in U.S. Pat. No. 4,862,730 to Crosby was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath. The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly. The cup assembly was weighed to the nearest 1/1000 g and was placed in an inverted manner onto the center of the test sample. Water transport was provided by the driving force between the water in the water bath and the saturated salt solution providing water flux by diffusion in that direction. The sample was tested for 15 minutes and the cup assembly was then removed and weighed again within 1/1000 g.

The MVTR of the sample was calculated from the weight gain of the cup assembly and was expressed in grams of water per square meter of sample surface area per 24 hours.

Membrane Thickness

Membrane thickness was measured by placing the membrane between two plates of a Kafer FZ1000/30 thickness snap gauge. An average of 3 measurements was used.

Weight

Weight measurements on materials were conducted as specified in ASTM D751, section 10. An average of three measurements was used.

Treated/Untreated Samples

As described in the examples below, "treated" refers to samples treated with the flame-retardant phosphonate ester mixture of Example 1, and "untreated" refers to control samples not treated with a flame retardant.

EXAMPLES

Example 1

A polyester woven fabric of approximately 110 gsm was obtained (Nan Ya Plastics, Taiwan, part No. SAAL031). A polymer resin-expandable graphite mixture made in accordance with the general teachings of U.S. Patent Publication No. 2009/0110919 (polymer content about 80 wt %, graphite about 20 wt %), and blended with polyurethane. The polymer resin-expandable graphite mixture was applied to the polyester woven fabric in a dot pattern using a conventional gravure process.

An expanded polytetrafluoroethylene (ePTFE) laminate formed by heat bonding a polyurethane between two layers of amorphously locked ePTFE. The ePTFE layers had a thickness of 25 μm and a density of 0.45 g/cc. A fluoroacrylate coating was then applied to the outer surface of the laminate to render it oleophobic while preserving the microporous structure.

Next, the ePTFE laminate was heat bonded to the polymer resin-expandable graphite mixture side of the polyester fabric to form a laminate. A dot pattern of polyurethane adhesive was metered onto an expanded PTFE membrane by a gravure roller in such a manner as to provide coverage of approximately 50 percent of the membrane. The gravure roller was heated to 120° C. and provided a laydown of about 70 gsm. The membrane was held against the gravure roller by a low durometer rubber roller at a pressure sufficient to effect removal of the adhesive dots onto the membrane. The printed membrane was transported at 0.38 m/s for a distance of about 0.46 m and laminated to a 102 gsm air textured yarn fabric in a nip between a chrome roller heated to 100° C. and a low durometer rubber roller. Phase separation that had occurred in the adhesive prevented wicking of the adhesive into the textile. Its softness provided good wetting characteristics. The laminated sample was allowed to cure with ambient moisture.

An aqueous mixture of i) phosphonic acid, methyl-,bis ((5-ethyl-2-methyl-2-oxido-1,3,2-dioxaphosphorinan-5-yl) methyl)ester and ii) methyl(5-ethyl-2-methyl-2-oxido-1,3,2-dioxaphosphorinan-5-yl)methyl methylphosphonate was prepared in water (20 wt % of the aqueous mixture; 80 wt % water). The mixture was applied to the polyester surface of the laminate by kiss coating. The coated laminate was dried and placed in a convection oven set to approximately 185° C.

The polyester laminate was rendered water repellant by the application of a fluoroacrylate emulsion to the polyester surface of the laminate. The laminate was then dried in a convection oven set to 170° C.

Vertical flame tests were conducted on above treated polyester laminates per ASTM D6413. Table 1 shows vertical flame test results, including afterflame (AF), presence of melting/dripping, and char length (CL), for treated laminate samples, T1-T5, prepared according to this example.

TABLE 1

| Sample | AF, s | Melt/Drip | Char Length, cm |
|--------|-------|-----------|-----------------|
| T1 | 1.13 | No | 4.4 |
| T2 | 0.91 | No | 4.5 |
| T3 | 1.13 | No | 4.5 |
| T4 | 1.03 | No | 5.1 |
| T5 | 1.28 | No | 4.5 |

Comparative Example 1

A polyester laminate was prepared according to Example 1, without the phosphonate ester treatment. Vertical flame tests were conducted on the untreated samples per ASTM D6413. Table 2 shows vertical flame test results, including afterflame (AF), presence of melting/dripping, and char length (CL), for untreated samples C1-C5, prepared according to this example.

TABLE 2

| Sample | AF, s | Melt/Drip | CL, cm |
|--------|-------|-----------|--------|
| C1 | 40.47 | No | >30* |
| C2 | 34.18 | No | >30* |
| C3 | 40.75 | No | >30* |
| C4 | 46.88 | No | >30* |
| C5 | 37.32 | No | >30* |

*Sample continued to burn and had to be extinguished.

Comparison of Example 1 and Comparative Example 1

Figure 6B:
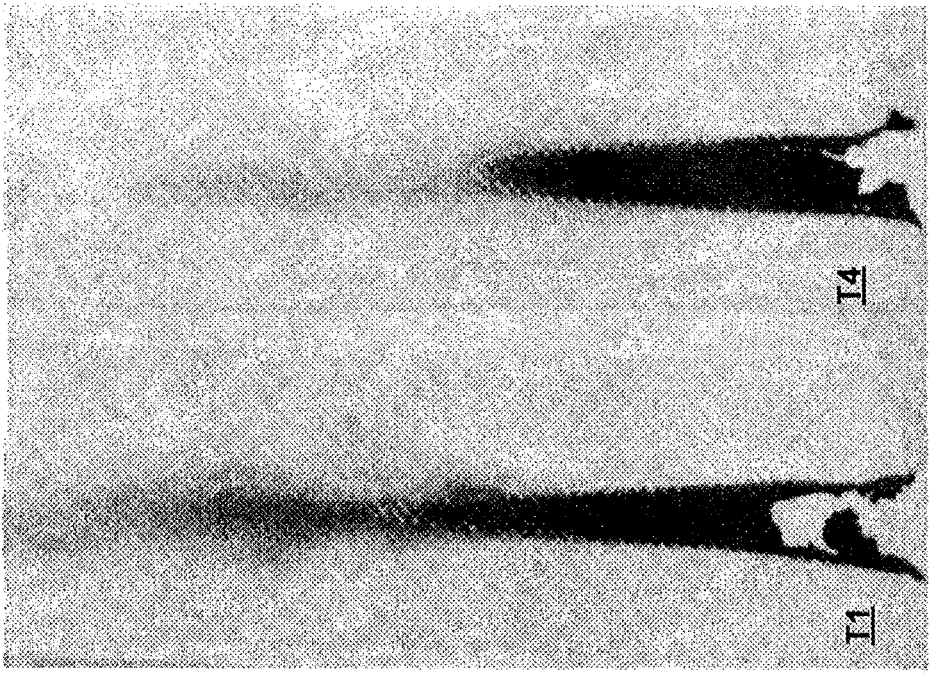
FIG. 6B is a photograph depicting an untreated laminate subjected to vertical flame tests according ASTM D6413.
Figure 6A:
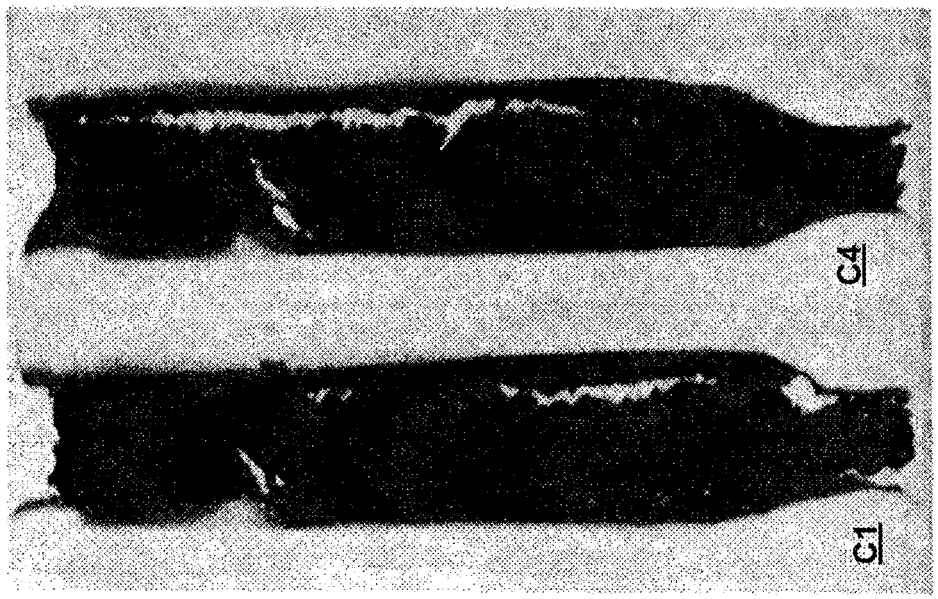
FIG. 6A is a photograph depicting a fire retardant laminate having been subjected to vertical flame tests according ASTM D6413 according to at least one embodiment of the present invention.

The treated samples of Example 1 (T1-T5) showed significant reduction in afterflame and char length compared to the untreated samples of Comparative Example 1 (C1-C5). FIG. 6A shows samples T1 (left) and T4 (right) after these samples were subjected to the vertical flame test. FIG. 6B shows samples C1 (left) and C4 (right) after these samples were subjected to the vertical flame test.

Moisture vapor transmission rate (MVTR) measurements were conducted on the polyester laminates. Table 3 shows MVTR results and vertical flame test results for treated laminate T6 and control laminate C6 prepared according to the procedure described in Example 1 and Comparative Example 1, respectively. As shown in Table 3, while the afterflame and char length of T6 were significantly shorter than those of C6, the breathability of the samples were comparable.

TABLE 3

| Sample | MVTR (15 min); g/m2/24 hrs | AF, s | CL, cm |
|---|---|---|---|
| T6 | 4349 | 0.63 | 5.9 |
| C6 | 4300 | 43 | >30* |

*Sample continued to burn and had to be extinguished.

Example 2

A polyester woven fabric was obtained (Milliken Corporation, USA, part No. WNAX047C). A polymer resin-expandable graphite mixture was prepared. The polymer resin-expandable graphite mixture made in accordance with the general teachings of U.S. Patent Publication No. 2009/0110919 (polymer content 80 wt %, graphite content 20 wt %), as described herein, and blended with polyurethane. The polymer resin-expandable graphite mixture was applied to the polyester fabric in a dot pattern using a conventional gravure process.

An expanded polytetrafluoroethylene (ePTFE) laminate formed by heat bonding a polyurethane sandwiched between two layers of amorphously locked ePTFE membranes was obtained. The ePTFE membranes had a thickness of 25 μm and a density of 0.45 g/cc. A fluoroacrylate coating was then applied to the outer surface of the laminate to render it oleophobic while preserving the microporous structure.

Next, the ePTFE laminate was heat bonded to the polymer resin-expandable graphite mixture side of the polyester fabric to form a laminate in a modular web making equipment. A 60 gsm meta-aramid woven textile layer (Springfield, LLC, USA, part No. WNPZ100) was then adhered to the laminate by feeding the aramid backer through an additional nip. This laminate was then allowed to cure at >50% relative humidity.

An aqueous mixture of phosphonic acid, methyl-,bis((5-ethyl-2-methyl-2-oxido-1,3,2-dioxaphosphorinan-5-yl) methyl)ester and methyl(5-ethyl-2-methyl-2-oxido-1,3,2-dioxaphosphorinan-5-yl)methyl methylphosphonate in a ratio of 1:1 was prepared as described in Example 1. The mixture was applied to the outer surface of the laminate by kiss coating. The laminate was dried and placed in a convection oven set to approximately 185° C.

Vertical flame tests were conducted on the laminates per ASTM D6413. Table 3 shows vertical flame test results, including afterflame (AF) and char length (CL), for treated laminate samples T7 and T8 prepared according to this example.

TABLE 3

| Sample | AF, s | CL, cm |
|---|---|---|
| T7 | 0.5 | 1.5 |
| T8 | 0 | 3.5 |

Comparative Example 2

A polyester laminate was prepared as in Example 2, except no phosphonate ester was employed. Vertical flame tests were conducted on above treated laminates per ASTM D6413. Table 4 shows vertical flame test results, including afterflame (AF) and char length (CL), for untreated laminate samples C7 and C8 prepared according to this example.

TABLE 4

| Sample | AF, s | Char Length, cm |
|---|---|---|
| C7 | 6.07 | 7.2 |
| C8 | 6.56 | 10.1 |

Comparison of Example 2 and Comparative Example 2

Treated and untreated polyester laminates prepared according to Example 2 and Comparative Example 2, respectively, were tested for wash durability and found to have adequate durability after washing five times per AATCC washing method No. 24. Vertical flame tests were conducted on the washed polyester laminates per ASTM D6413. Table 5 shows vertical flame test results, including afterflame (AF) and char length (CL), for treated laminate sample T9 and untreated laminate sample C9 prepared according to Example 2 and Comparative Example 2, respectively. As shown in Table 5, the afterflame and char length of treated laminate sample T9 were significantly lower than the afterflame and char length of untreated laminate sample C9.

TABLE 5

| Sample | AF, s | CL, cm | Comments |
|---|---|---|---|
| T9 | 1.9 | 3.5 | Washed and dried 5x per AATCC test method 25 |
| C9 | 15.28 | 10.2 | Washed and dried 5x per AATCC test method 25 |

Example 3

A laminate was prepared as described in Example 1 without the polyurethane dots and polymer resin-expandable graphite mixture. PET polyester, texturized, 70/34 count warp and 70/47 count fill; semi-dull, fibers were used. Vertical flame tests were conducted per ASTM D6413. Table 6 shows vertical flame test results conducted on 3"×8" samples, including afterflame (AF), the presence of melting/dripping, and char length (CL), for treated laminate sample T10 and untreated laminate sample C10 prepared according to this example. Significant differences were apparent in afterglow, melting/dripping, and char length.

TABLE 6

| Sample | AF, s | Melt/Drip | CL, cm |
|---|---|---|---|
| T10 | 0 | No | 11 |
| C10 | 6.35 | Yes | >20* |

*Sample continued to burn and had to be extinguished.

Example 4

A laminate was prepared as described in Example 1 with the exception that nylon fabric was used (Milliken, USA, part No. WMPX103E) instead of polyester. Vertical flame tests were conducted per ASTM D6413, Table 7 shows vertical flame test results conducted on 3"×8" samples, including afterflame (AF), the presence of melting/dripping, and char length (CL), for treated laminate samples T11-T14 and untreated laminate samples C11-C14 prepared according to this example. Significant differences were apparent in afterglow, melting/dripping, and char length.

TABLE 7

|  | AF, s | Melt/Drip | CL, cm |
|---|---|---|---|
| T-11 | 0.52 | No | 13 |
| T-12 | 0.44 | No | 8.7 |
| T-13 | 0.40 | No | 4.6 |
| T-14 | 0.37 | No | 3.5 |
| C-11 | 17.97 | Yes | >20* |
| C-12 | 21.06 | Yes | >20* |
| C-13 | 20.10 | Yes | >20* |
| C-14 | 15.07 | Yes | >20* |

*Sample continued to burn and had to be extinguished.

Example 5A

Laminates were prepared according to Example 1. The laminates were contaminated with jet fuel (Jet Propellant 8; commercial grade; Exxon Mobil) as follows. Ten drops of jet fuel were directly applied to the center portion of 3"×8" laminates and allowed to soak. In another instance, about 20 drops (1 mL) of jet fuel were applied to the bottom portion of 3"×8" laminates and allowed to soak. Vertical flame tests were conducted per ASTM D6413. Table 8 shows vertical flame test results, including afterflame (AF), afterglow (AG), and char length (CL), for treated laminate samples T15 and T16 and untreated laminate samples C15 and C16 prepared according to this example, with samples T15 and C15 receiving 10 drops of JP8 at the center of the sample, and samples T16 and C16 receiving 20 drops of JP8 at the bottom of the sample.

TABLE 8

| Sample | AF, s | AG, s | CL, cm |
|---|---|---|---|
| C15 | 27.84 | 1.2 | 20* |
| T15 | 0.92 | 1.4 | 4.7 |
| C16 | 30.85 | 1.2 | 20* |
| T16 | 0.67 | 1.3 | 4.05 |

*Sample continued to burn and had to be extinguished.

Example 5B

Laminates were prepared according to Example 1, The laminates were contaminated with diesel fuel (commercial grade diesel fuel; Exxon Mobil) in the following manners. Ten drops of diesel fuel were directly applied to the center portion of 3"×8" laminates and allowed to soak. In another instance, about 20 drops (1 mL) of diesel fuel were applied to the bottom portion of 3"×8" laminates and allowed to soak. Vertical flame tests were conducted per ASTM D6413. Table 9 shows vertical flame test results, including afterflame (AF), afterglow (AG), and char length (CL), for treated laminate samples T17 and T18 and untreated laminate samples C17 and C18 prepared according to this example, with samples T17 and C17 receiving 10 drops of diesel fuel at the center of the sample, and samples T18 and C18 receiving 20 drops of diesel fuel at the bottom of the sample.

TABLE 9

| Sample | AF, s | AG, s | CL, cm |
|---|---|---|---|
| C17 | 32.11 | 1.1 | 20* |
| T17 | 0.85 | 1.4 | 5.5 |
| C18 | 28.80 | 1.3 | 20* |
| T18 | 0.66 | 1.2 | 4.90 |

*Sample continued to burn and had to be extinguished.

Example 5C

Laminates were prepared according to Example 1. The laminates were contaminated with motor oil (commercial grade motor oil; Exxon Mobil) in the following manners. Ten drops of motor oil were directly applied to the center portion of 3"×8" laminates and allowed to soak. In another instance, about 20 drops (1 mL) of motor oil were applied to the bottom portion of 3"×8" laminates and allowed to soak. Vertical flame tests were conducted per ASTM D6413. Table 10 shows vertical flame tests results, including afterflame (AF), afterglow (AG), and char length (CL), for treated laminate samples T19 and T20 and untreated laminate samples C19 and C20 prepared according to this example, with samples T19 and C19 receiving 10 drops of motor oil at the center of the sample, and samples T20 and C20 receiving 20 drops of motor oil at the bottom of the sample.

TABLE 10

| Sample | AF, s | AG, s | CL, cm |
|---|---|---|---|
| C19 | 28.91 | 1.2 | 20* |
| T19 | 0.80 | 1.5 | 4.0 |
| C20 | 31.36 | 1.25 | 20* |
| T20 | 0.77 | 1.4 | 4.85 |

*Sample continued to burn and had to be extinguished.

Example 6

A textile two-layer composite was prepared as follows: A woven nylon textile, made of 100% polyamide 6, 6 yarns (Toray textile, Europe Ltd, part No. MGNY001DF). The weight of the face textile was 100 gsm. A knit textile made of 65% PET polyester yarn and 35% cotton yarn was used as the backer (Ames Europe Enschede BV, part No. AMBL055). A backer textile was arranged and bonded to the inner side of the face textile to form a 2 layer textile composite. Sample T21 was treated with the phosphonate ester mixture as described in Example 1. Vertical flame tests were conducted per ASTM D6413. Table 11 shows vertical flame test results, including afterflame (AF), afterglow (AG), and char length (CL), for treated laminate sample T21 and untreated laminate sample C21 prepared according to this example.

TABLE 11

| Sample | AF, s | AG, s | CL, cm |
|---|---|---|---|
| C21 | 43.09 | 43.09 | >20* |
| T21 | 0.75 | 1.2 | 6.25 |

*Sample continued to burn and had to be extinguished.

Example 7

A commercially available poly(trimethylene terephthalate) (PTT), partially bio-based two-layer laminate was obtained (Taihua Specialty Textile Jiaxing Company, China. Sample T22 was treated with the phosphonate ester mixture as described in Example 1. Vertical flame tests were conducted per ASTM D6413. Table 12 shows vertical flame test results, including afterflame (AF), afterglow (AG), and char length (CL), for treated laminate sample T22 and untreated laminate sample C22 prepared according to this example.

TABLE 12

| Sample | AF, s | AG, s | CL, cm |
|---|---|---|---|
| C22 | 37.56 | 1.0 | >20* |
| T22 | 0 | 1.0 | 5.0 |

*Sample continued to burn and had to be extinguished.

Example 8

A polybenzimidazole (PBI) fabric was obtained (Safety Components, USA, part No. EXVR001). The fabric was treated with the phosphonate ester mixture as described in Example 1. Vertical flame tests were conducted per ASTM D6413. Table 13 shows vertical flame test results, including afterflame (AF), afterglow (AG), and char length (CL), for treated sample T23 and untreated sample C23. Particularly notable is the significant reduction in afterglow as well as a reduction in char length of the treated sample T23 compared to the untreated sample C23.

TABLE 13

| Sample | AF, s | AG, s | CL, cm |
|---|---|---|---|
| C23 | 0 | 9.5 | 0.8 |
| T23 | 0 | 1.9 | 0.5 |

Example 9

A commercially available para-aramid fabric was obtained. The fabric was treated with the phosphonate ester mixture as described in Example 1. Vertical flame tests were conducted per ASTM D6413. Table 14 shows vertical flame test results, including afterflame (AF), afterglow (AG), and char length (CL), for treated sample T24 and untreated sample C24. Particularly notable is the significant reduction in afterglow as the treated sample T24 compared to the untreated sample C24.

TABLE 14

| Sample | AF, s | AG, s | CL, cm |
|---|---|---|---|
| C24 | 0 | 15.4 | 1.0 |
| T24 | 0 | 1.6 | 0.7 |

Example 10

A commercially available industrial heavy-denier nylon fabric was obtained (Invista, USA). The fabric was treated with the phosphonate ester mixture as described in Example 1. Vertical flame tests were conducted per ASTM D6413. Table 16 shows vertical flame test results, including afterflame (AF), afterglow (AG), and char length (CL), for treated sample T25 and untreated sample C25.

TABLE 15

| Sample | AF, s | AG, s | CL, cm |
|---|---|---|---|
| C25 | 107.37 | 1.0 | >30* |
| T25 | 6.94 | 0 | 8 |

*Sample continued to burn and had to be extinguished.

Example 11

A commercially available meta-aramid fabric was obtained (Springfield, LLC, USA, part No. WNPZ100). The fabric was treated with the phosphonate ester mixture as described in Example 1. Vertical flame tests were conducted per ASTM D6413. Table 16 shows vertical flame test results, including afterflame (AF), afterglow (AG), and char length (CL), for treated sample T26 and untreated sample C26. Particularly notable is the reduction in char length of the treated sample T26 compared to the untreated sample C26.

TABLE 16

| Sample | AF, s | AG, s | CL, cm |
|---|---|---|---|
| C26 | 0.65 | 1.20 | 6.80 |
| T26 | 0.41 | 1.20 | 3.50 |

Example 12

A fabric laminated with a porous polyurethane (PU) membrane was prepared. The fabric was treated with the phosphonate ester mixture as described in Example 1. Vertical flame tests were conducted per ASTM D6413. Table 17 shows vertical flame test results, including afterflame (AF), afterglow (AG), and char length (CL) for treated sample T27 and untreated sample C27. Particularly notable is the reduction in char length of the treated sample T27 compared to the untreated sample C27.

TABLE 17

| Sample | AF, s | AG, s | CL, cm |
|---|---|---|---|
| C27 | 11.48 | N/A | 11.93 |
| T27 | 0 | 1.14 | 4.50 |

Example 13

A modacrylic fabric laminated with a polyurethane (PU) membrane was obtained. The fabric was treated with the phosphonate ester mixture as described in Example 1. Vertical flame tests were conducted per ASTM D6413. Table 18 shows vertical flame test results, including afterflame (AF), afterglow (AG), and char length (CL), for treated sample T28 and untreated sample C28. Particularly notable is the reduction in afterglow of the treated sample T28 compared to the untreated sample C28. The char length was also reduced.

TABLE 18

| Sample | AF, s | AG, s | CL, cm |
|---|---|---|---|
| C28 | 0 | 11.24 | 16.33 |
| T28 | 0 | 1.82 | 13.00 |

Example 14

A flame-retardant cotton fabric laminated with a polyurethane (PU) membrane was obtained. The fabric was treated with the phosphonate ester mixture as described in Example 1. Vertical flame tests were conducted per ASTM D6413. Table 16 shows vertical flame test results, including afterflame (AF), afterglow (AG), and char length (CL), for treated sample T29 and untreated sample C29. The char length of the treated sample was reduced compared to the char length of the untreated sample.

TABLE 19

| Sample | AF, s | AG, s | CL, cm |
|---|---|---|---|
| C29 | 0.33 | N/A | 6.53 |
| T29 | 0 | 1.60 | 5.43 |

Example 15

A filter media consisting of a polyester nonwoven, ePTFE membrane, and a spun bonded polypropylene was prepared. Sample T30 was treated with the phosphonate ester mixture as described in Example 1. Vertical flame tests were conducted per ASTM D6413. Table 20 shows the vertical flame test results, including afterflame (AF), afterglow (AG), and char length (CL), for treated filter media sample T30 and untreated filter media sample C30. There was significant reduction in afterflame and char length for the treated filter media compared to the control.

TABLE 20

| Sample | AF, s | AG, s | CL, cm |
|---|---|---|---|
| C30 | 19.56 | 0 | >20* |
| T30 | 0 | 0 | 8.5 |

*Sample continued to burn and had to be extinguished.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A fire retardant laminate comprising:
a first textile layer;
a first porous membrane;
a coating layer, said porous membrane being positioned between said first textile layer and said coating layer, and wherein the first porous membrane and coating layer form a protective layer; and
a fire retardant comprising one or more phosphonate esters having the general formula:

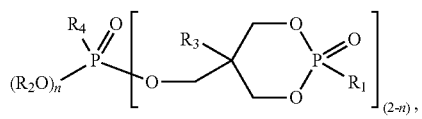

wherein n=0 or 1, $R_1$ and $R_2$ are $C_1$-$C_4$ alkyl, $R_3$ is H or $C_1$-$C_4$ alkyl, and $R_4$ is a linear or branched alkyl,
wherein 1 wt % to 5 wt % of the phosphorus present as phosphonate ester in the fire retardant laminate resides in the first porous membrane and coating layer, and
wherein said fire retardant at least partially penetrates said coating layer.

2. The fire retardant laminate of claim 1, wherein said first porous membrane is a porous fluoropolymer membrane or a polyurethane membrane.

3. The fire retardant laminate of claim 1, wherein said first porous membrane comprises polytetrafluoroethylene or expanded polytetrafluoroethylene.

4. The fire retardant laminate of claim 1, wherein said first textile layer comprises a woven fabric, a nonwoven fabric, or a knit fabric.

5. The fire retardant laminate of claim 4, wherein the first textile layer comprises a nonwoven fabric, said nonwoven fabric including a member selected from the group consisting of a thermoplastic fiber, a carbon fiber, an aramid fiber and combinations thereof.

6. The fire retardant laminate of claim 1, wherein the first textile layer comprises a natural fiber, a synthetic fiber, or a combination thereof.

7. The fire retardant laminate of claim 1, wherein the first textile layer has thereon a water-repellant substance.

8. The fire retardant laminate of claim 1, wherein said coating layer comprises polyurethane.

9. The fire retardant laminate of claim 1, wherein the protective layer further comprises a second porous membrane and an intermediate layer, and
wherein said intermediate layer is sandwiched between said first porous membrane and said second porous membrane.

10. The fire retardant laminate of claim 9, wherein said intermediate layer comprises a member selected from the group consisting of a porous layer of polyurethane and a non-porous layer of polyurethane.

11. The fire retardant laminate of claim 9, wherein said intermediate layer comprises a member selected from the group consisting of an elastomer, a polymer resin, an expandable graphite, an adhesive, an antistatic material and combinations thereof.

12. The fire retardant laminate of claim 11, wherein said intermediate layer comprises silicone.

13. The fire retardant laminate of claim 1, further comprising a second textile layer positioned on said protective layer opposing said first textile layer.

14. The fire retardant laminate of claim 13, wherein second textile layer comprises a woven fabric, a nonwoven fabric, or a knit fabric.

15. The fire retardant laminate of claim 14, wherein said second textile layer comprises an aramid fiber.

16. The fire retardant laminate of claim 14, wherein the fire retardant at least partially penetrates said second textile layer.

17. The fire retardant laminate of claim 1, wherein the fire retardant comprises an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl)methyl methylphosphonate.

18. The fire retardant laminate of claim 17, wherein the fire retardant comprises an aqueous mixture of said phosphonic acid, methyl-,bis((5-ethyl-2-methyl-2-oxido-1,3,2-dioxaphosphorinan-5-yl)methyl)ester and said methyl(5-ethyl-2-methyl-2-oxido-1,3,2-dioxaphosphorinan-5-yl) methyl methylphosphonate in a weight ratio of about 0.3 to about 2.

19. The fire retardant laminate of claim 1, wherein the fire retardant laminate, when subjected to a vertical flame test according to ASTM D6413, demonstrates an afterflame of less than 2 seconds.

20. The fire retardant laminate of claim 19, wherein said fire retardant laminate has been subjected to petroleum, oil, a lubricant, or combinations thereof prior to being subjected to said vertical flame test.

21. The fire retardant laminate of claim 1, wherein the fire retardant laminate, when subjected to a vertical flame test according to ASTM D6413, demonstrates a char length of less than 10 cm.

22. The fire retardant laminate of claim 21, wherein said fire retardant laminate has been subjected to petroleum, oil, a lubricant, or combinations thereof prior to being subjected to said vertical flame test.

23. The fire retardant of claim 1, further comprising a polymer resin-expandable graphite mixture positioned on an inner surface of said first textile layer.

24. The fire retardant laminate of claim 1, wherein the fire retardant penetrates the first textile layer.

25. The fire retardant laminate of claim 1, wherein the fire retardant penetrates the first membrane.

26. A fire retardant laminate comprising:
a first textile layer;
a protective layer including a first porous membrane, a second porous membrane, and a polyurethane layer positioned between said first and second porous membranes, wherein said first porous membrane is positioned adjacent said first textile layer; and
a fire retardant comprising one or more phosphonate esters having the general formula:

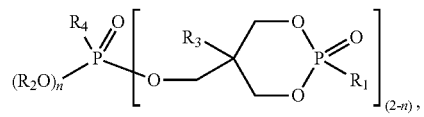

wherein n=0 or 1, $R_1$ and $R_2$ are $C_1$-$C_4$ alkyl, $R_3$ is H or $C_1$-$C_4$ alkyl, and $R_4$ is a linear or branched alkyl,
wherein about 1 wt % to 5 wt % of the phosphorus present as phosphonate ester in the fire retardant laminate resides in the protective layer, and
wherein said fire retardant at least partially penetrates said polyurethane layer.

27. The fire retardant laminate of claim 26, wherein said first and second porous membranes comprise a membrane selected from the group consisting of a porous fluoropolymer membrane and a polyurethane membrane.

28. The fire retardant laminate of claim 27, wherein at least one of said first porous membrane and said second porous membrane comprises polytetrafluoroethylene or expanded polytetrafluoroethylene.

29. The fire retardant laminate of claim 26, wherein said first textile layer comprises a woven fabric, a nonwoven fabric, or a knit fabric.

30. The fire retardant laminate of claim 26, wherein the first textile layer comprises a nonwoven fabric, said nonwoven fabric comprising a member selected from the group consisting of a thermoplastic fiber, a carbon fiber, an aramid fiber and combinations thereof.

31. The fire retardant laminate of claim 26, wherein said first textile layer comprises a natural fiber, a synthetic fiber, or a combination thereof.

32. The fire retardant laminate of claim 26, further comprising a second textile layer positioned on said protective layer opposing said first textile layer.

33. The fire retardant laminate of claim 32, wherein said second textile layer comprises a woven fabric, a nonwoven fabric, or a knit fabric.

34. The fire retardant laminate of claim 32, wherein said second textile layer comprises an aramid fiber.

35. The fire retardant laminate of claim 32, wherein said fire retardant at least partially penetrates said second textile layer.

36. The fire retardant laminate of claim 32, wherein at least one of said first textile layer and said second textile layer comprise at least one member selected from the group consisting of poly(trimethylene terephthalate) fibers, polybenzimidazole fibers, para-aramid fibers, nylon fibers, meta-aramid fibers and combinations thereof.

37. The fire retardant laminate of claim 26, wherein the fire retardant comprises an aqueous mixture of phosphonic acid, methyl-,bis((5-ethyl-2-methyl-2-oxido-1,3,2-dioxaphosphorinan-5-yl)methyl)ester and methyl(5-ethyl-2-methyl-2-oxido-1,3,2-dioxaphosphorinan-5-yl)methyl methylphosphonate.

* * * * *